March 29, 1960 A. A. COWAN 2,930,401
POPPET VALVE CONSTRUCTION
Filed Nov. 16, 1956
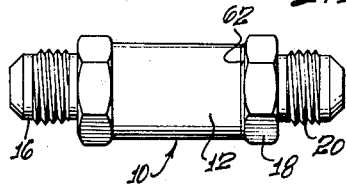
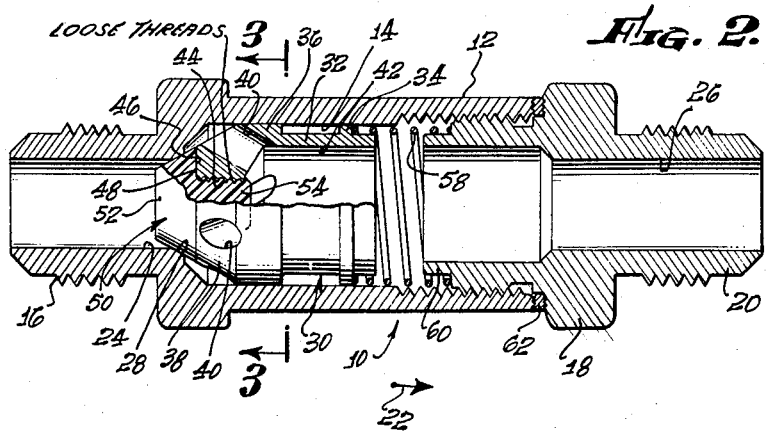
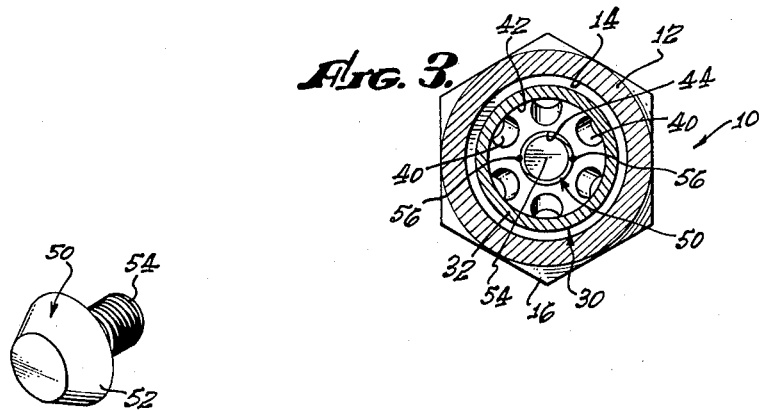
ARNOLD A. COWAN,
INVENTOR.
BY Thomas P. Maloney
ATTORNEY.

2,930,401
POPPET VALVE CONSTRUCTION

Arnold A. Cowan, Los Angeles, Calif., assignor to Bobrick Manufacturing Corporation, Los Angeles, Calif., a corporation of Delaware Application November 16, 1956, Serial No. 622,550

2 Claims. (Cl. 137—540)

This invention relates to a poppet-type valve and, more particularly, to a poppet-type valve which includes a composite valve member.

The poppet-type valve of my invention is designed particularly for applications wherein extreme low temperatures are encountered, such as in the liquid oxygen lines of rockets and rocket-powered aircraft. Among the difficulties encountered with conventional valve constructions, when applied in such low temperature environments, is the distortion and resultant failure of conventional valve members in such conventional valve constructions whereby leakage of high pressure fluids takes place.

Furthermore, continued exposure to high temperature fluids and gases in fluid form frequently results in the complete destruction of the valve member due to the creation of unequal stresses in the valve member body. Naturally, such failures are not predictable and frequently result in the loss of valuable rockets or aircraft in which the conventional valves are incorporated.

It is, therefore, an object of my invention to provide a poppet valve construction which is characterized by the incorporation of a composite valve member, said composite valve member being reciprocable in the valve housing and including an elongated valve body having mounted on one extremity thereof a valve seat engaging insert having a coefficient of expansion which is different from the coefficient of expansion of the valve body.

A further object of my invention is the provision of a poppet valve including a valve member of the aforementioned character which is characterized by the fact that the bulk of the machining operations necessary in the formation of the valve take place in the valve body, whereas, the insert in said valve body is exposed to a relatively minimal amount of machining. Thus, the stress concentrations attributable to the machining of the valve body are localized in the valve body and are not transmitted to the insert mounted upon the one extremity thereof. In this manner, stress concentrations which cause the distortion of valve members in conventional valves of the character under consideration here have no effect whatsoever upon the insert in one extremity of the valve body, thus preventing such stress concentrations or distortions in the valve body from being transmitted to the valve seat engaging insert and thus eliminating the possibility that such stress concentrations and distortions will unseat the insert from operative relationship with the valve seat.

It is well known that, in low temperature applications, unequal expansion of conventional metallic poppet valves will prevent the accurate seating of the valve seat engaging portions thereof, thus permitting by-passing of fluid therepast. An additional object of my invention is the provision of a valve incorporating a composite valve member which includes an elongated body formed from metal, such as aluminum or the like, and which body has mounted in an extremity thereof a plastic, valve seat engaging insert, said plastic insert being capable of sustaining extremely low temperatures as low as —300° F. By providing a composite valve member of this character, the stresses encountered in the body are not transmitted to the insert and, conversely, stresses created in the insert are not transmitted to the body.

Thus, optimum sealing relationship between the insert and the valve seat is achieved and the effective life of the valve member is materially greater than that of conventional valve members incorporated in conventional valves.

While there are many plastic materials which are capable of sustaining the low temperatures to which the valve of my invention is exposed, I have found that several of the relatively new plastics are ideally suited for use in the construction of the composite valve member and, more particularly, in the formation of the insert therefor. For satisfactory performance, such plastics must be characterized by extreme resistance to various types of fuels to which they will be exposed, particularly to the hydrocarbons and to such fuels as liquid oxygen, and the like. Of even greater importance is the resistance of these plastics to extremely low temperatures in a range between —300° F. to 520° F.

The plastics utilized should also be characterized by unusual hardness which permits them to resist wear and the erosion effect of the low temperature fluids flowing therepast and they should have at least a hardness on the Shore hardness durometer, D scale, of from 55 to 80.

Among the plastics which have met the above requirements are the polytetrafluoroethylene and polytrifluorochloroethylene resins. These plastics are characterized by high dielectric strength, low power factor, extreme adhesion resistance, and chemical resistance.

Actual valves constructed in accordance with the teachings of my invention have been tested successfully at zero leakage for very low back pressures and under the same conditions which caused conventional structures, such as valves incorporating all metal valve members or all plastic valve members, to fail. Therefore, the combination of the metallic valve body with the plastic insert has produced results not attainable with the valves of the prior art and has permitted the successful utilization of the valves of my invention in applications which could not successfully be handled by the use of conventional constructions.

Other objects and advantages of my invention will be apparent from the following specification and the accompanying drawing which is for the purpose of illustration only and in which:

Fig. 1 is a side elevational view of a poppet-type valve constructed in accordance with the teachings of my invention;

Fig. 2 is a longitudinal, sectional view of the valve shown in Fig. 1;

Fig. 3 is a vertical, sectional view taken from the broken line 3—3 of Fig. 2; and Fig. 4 is a perspective view showing the plastic insert utilized in combination with the body and valve member incorporated in the poppet valve of my invention.

Referring to the drawing and particularly to Figs. 1–2 thereof, I show a poppet-type valve 10 constructed in accordance with the teachings of my invention incorporated in an elongated, substantially cylindrical housing 12 which defines a valve chamber 14. One end of the housing 12 is provided with a threaded tubular coupling 16 engageable with the line, not shown, while the other extremity of the housing has a fitting 18 mounted therein which is provided with a coupling portion 20 for engagement with an associated line, not shown.

The direction of flow through the valve 10 is indicated by the arrow 22 and, thus, the coupling 16 serves as an inlet port 24, while the fitting 18 serves as the outlet port 26.

Formed in an end wall of the valve chamber 14 is a valve seat 28 which, as best shown in Fig. 2 of the drawing, has a reciprocable valve member 30 associated therewith. The valve member 30 includes an elongated, cylindrical body 32 formed from aluminum, or the like, and provided with a radially directed bearing flange 34 at one extremity which co-operates with a somewhat larger bearing surface 36 adjacent the opposite extremity of the body 32 to support the body 32 for relatively free sliding movement in the valve chamber 14.

The valve body 32 is provided, at its left-hand extremity, as best shown in Fig. 2 of the drawing, with a frusto-conical head 38 in which is formed a plurality of ports 40, said ports being angularly oriented with respect to the longitudinal axis of the body 32 and communicating with an elongated bore 42 provided through said body. The ports 40 and the bore 42 permit fluid to flow from the inlet port 24 past the valve body 32 when the valve member 30 is unseated from its associated seat 28, in a manner to be described in greater detail below, and thus prevent the valve member 30 from creating unduly high back pressures in the line in which it is inserted.

A threaded, insert receiving bore 44 is formed in the head 38 of the body 32 and said head terminates in a flat face 46 against which is located the shoulder of a valve seat engaging insert 50, said insert being provided with a substantially frusto-conical valve seat engaging portion 52 which has a rearwardly extending threaded shank 54 formed integrally therewith for engagement with the correspondingly threaded bore 44 in the head 38 of the body 32. It should be noted that the fit of the threaded shank 54 in the threaded bore 44 of the body 32 is such that allowance for linear expansion and contraction of the insert is permitted without materially affecting the operating clearances and thus without materially affecting the proper seating relationship between the frusto-conical valve seat engaging portion 52 of the insert 50 with the valve seat 28.

In this manner, the insert 50 is securely retained in the left-hand extremity of the body 32, but it is not constrained against relative movement with respect to said valve body, thus permitting the insert 50 and, more particularly, the frusto-conical valve seat engaging portion 52 thereof to hunt its most effective sealing relationship with said valve seat. However, to prevent unthreading of the shank 54 of the insert 50 from operative engagement with the correspondingly threaded bore 44 in the head 38, the shank is staked in the bore, as best shown at 56 in Fig. 3 of the drawing.

A compression spring 58 located in the valve chamber 14 has one end seated upon the bearing flange 34 while its other extremity is received on an annular shoulder 60 provided on the threaded shank of the fitting 18 which engages a correspondingly threaded portion of the valve chamber 14. A sealing washer 62 is provided between the right-hand extremity of the housing 12 and the adjacent portion of the fitting 18 to prevent leakage of fluid from the valve chamber 14.

In the fabrication of the valve member 30, the body 32 thereof is obviously subjected to the bulk of the machining operations since the bearing flange 34, the ports 40, and the elongated bore 42 must be formed therein and thus create stress concentrations which can result in distortion of the body when it is subjected to extremes of temperature. After the bulk of the machining operations on the body 32 has been completed, the insert 50 is mounted in the bore 44 by engagement of the threaded shank 54 thereof with the threads of the bore and by imposition of the shoulder 48 of the insert 50 on the flat surface or face 46 on the head 36 of the body 32. After the assembly of the insert 50 with the body 32 has been accomplished, the final machining operation, including the staking of the insert 50 in the body 32 takes place.

When exposed to extreme low temperatures, as low as —300° F., which result from contact of the valve member 30 with extremely cold fluids, such as liquid oxygen, contraction of the valve body 32 may occur and such contraction may be unequal at points of stress concentration, resulting in distortion of the valve body 32. The unequal stresses created in the valve body 32 are, however, not transmitted to the insert 50 because of the fact that the thread relationship between the shank 54 of the inert 50 and the bore 44 of the body 32 is sufficiently loose to prevent lateral or longitudinal distortions of the body 32 from being communicated to the insert 50, thus preventing the stresses from being imposed upon said insert.

On the other hand, since the insert 50 is in engagement with the metallic seat 28 of the valve housing 12, distortion of said seat is frequently communicated to the insert 50 and, more particularly, the frusto-conical valve seat engaging portion 52 thereof which results in displacement of the portion 52 which is permitted because of the lost motion connection between the inert 50 and the body 32 of the valve member 30. Therefore, the valve body 32 cannot resist the tendencies of the insert 50 to accommodate valve seat distortion in the above described manner and complete conformity of the insert 50 to the seat 28 is thus accomplished.

It should also be noted that the insert 50 is solid and that the valve seat engaging portion 52 thereof is symmetrical in its cross section at the point of engagement of the insert with the valve seat 28. Thus, the possibility of obtaining an optimum sealing relationship between the insert 50 and the valve seat 28 is enhanced since the likelihood of the creation of unequal stresses in the uniform cross section is materially reduced.

Of note also is the fact that the bulk of the machining operations is performed on the aluminum body 32 of the valve member 30 which is most capable of bearing the stress concentrations induced by such machining operations. Moreover, the provision of the bearing flange 34 in the bearing surface 36 adjacent opposite extremities of the body 32 of the valve member 30 and particularly the reduced width thereof provides a minimal contact area between the bearing flange 34 and the bearing surface 36 and the adjacent wall of the valve chamber 14 thus reducing the tendency of the valve member 30 to stick at low temperatures.

Particularly applicable for use in fabricating the insert 50 are the polytetrafluoroethylene and polytrifluorochloroethylene resins. Polytetrafluoroethylene resin is characterized by its high dielectric strength, low power factor, extreme adhesion resistance, utility from —300° F. to 500° F., and chemical resistance. It is unaffected by all oils and chemicals except molten alkali metals, and fluorine, at elevated temperatures and pressures. It is also possessed of such a low coefficient of friction that it is frequently considered "shelf-lubricaitng."

Polytetrafluoroethylene resin has a tensile strength of between 1525 and 2500 p.s.i. and a Shore hardness on the durometer D scale of between 55–80. In normal temperature applications, its working temperatures range between —300 to 525° F. The specific gravity of the resin ranges between 2.1–2.3 with a water absorption of zero.

Among the physical characteristics of polytrifluorochloroethylene resin are a tensile strength at 77° F. of 5730 p.s.i. On the Shore durometer D scale, the value of the resin is 80 and its specific gravity is 2.1. The coefficient of expansion of the material from —80° to 20° C. is $4.5 \times 10^5$.

Obviously, the coefficient of expansion of both resins is greater than that of aluminum and, therefore, when an insert 50 is formed from either of the resins there is a difference between the coefficient of expansion of the body 32 and the insert 50 mounted therein. However, the differences in the coefficient of expansion of the two materials does not adversely affect the sealing operation of the valve member 30 because of the lost motion connection between the insert and the valve member.

I thus provide by my invention a poppet valve which includes a valve member characterized by the efficacy with which it seals against a valve seat when exposed to lower temperatures of an order of as low as − 300° F. The valve member is also characterized by the relatively long life thereof due to the hardness of the plastic material embodied in the insert portion which resists erosion because of fluids under high pressures flowing therepast.

I claim as my invention:

1. In a valve construction, the combination of: a housing defining a valve chamber and having inlet and outlet ports provided therein with a valve seat formed upon a wall of said chamber intermediate said ports; a valve member disposed within said chamber for reciprocatable movement, said valve member including an elongated tubular body having a reduced, threaded bore at one extremity thereof, said one extremity being of frusto-conical configuration, and a flat, annular surface at said one extremity adjacent said threaded bore, a valve seat engaging insert being mounted in said threaded bore and having a frusto-conical nose portion engaged upon said annular surface and a threaded shank formed integrally with said nose portion and extending completely through said threaded bore, the frusto-conical configuration of said insert mating with the frusto-conical configuration of said one extremity, the threaded connection between said shank and said threaded bore being sufficiently loose to constitute a lost motion connection between said shank and said threaded bore whereby individual displacement of said body or said insert will not be communicated from said body to said insert, or vice versa, and said insert and tubular body being formed of materials having different coefficients of thermal expansion; and a spring in said chamber for urging the nose portion of said insert into engagement with said seat.

2. In a valve construction, the combination of: a housing defining a valve chamber and having inlet and outlet ports provided therein with a valve seat formed upon a wall of said chamber intermediate said ports; a valve member disposed within said chamber for reciprocatable movement, said valve member including an elongated, tubular body having a reduced, threaded bore at one extremity thereof and a flat, annular surface at said one extremity adjacent said threaded bore, a valve seat engaging insert being mounted in said threaded bore and having a frusto-conical nose portion engaged upon said annular surface and a threaded shank formed integrally with said nose portion and extending completely through said threaded bore, said insert and said tubular body being formed of materials having different coefficients of thermal expansion and the threaded connection between said shank and said threaded bore being sufficiently loose to constitute a lost motion connection between said shank and said threaded bore whereby individual displacement of said body or said insert will not be communicated from said body to said insert, or vice versa, the protruding end of said shank within said body being staked to said body to prevent substantial relative rotation between said insert and said body; and a spring in said chamber for urging the nose portion of said insert into engagement with said seat.

References Cited in the file of this patent
UNITED STATES PATENTS

| | | |
|---|---|---|
| 240,754 | O'Meara | Apr. 26, 1881 |
| 1,775,090 | Frank | Sept. 9, 1930 |
| 2,687,277 | Bremer | Aug. 24, 1954 |
| 2,701,119 | Smith | Feb. 1, 1955 |
| 2,711,186 | Perez | June 21, 1955 |
| 2,717,757 | Bowlzer | Sept. 13, 1955 |
| 2,768,643 | Acomb | Oct. 20, 1956 |

FOREIGN PATENTS

| | | |
|---|---|---|
| 606,623 | Great Britain | Aug. 17, 1948 |